United States Patent [19]

Savage

[11] 3,812,662
[45] May 28, 1974

[54] TREE SHAKER WITH TREE EMBRACING CLAMP

[76] Inventor: Basil W. Savage, Box 38, Madill, Okla. 73446

[22] Filed: Sept. 29, 1972

[21] Appl. No.: 293,464

Related U.S. Application Data

[63] Continuation of Ser. No. 68,731, Sept. 1, 1970, abandoned, which is a continuation-in-part of Ser. No. 17,083, March 6, 1970, Pat. No. 3,594,999.

[52] U.S. Cl............................................. 56/328 TS
[51] Int. Cl............................................ A01g 19/08
[58] Field of Search ........................ 56/328 TS, 329

[56] References Cited
UNITED STATES PATENTS 3,491,520   1/1970   Watson .......................... 56/328 TS
3,548,578   12/1970  Shipley, Jr...................... 56/328 TS Primary Examiner—Louis G. Mancene
Assistant Examiner—J. N. Eskovitz
Attorney, Agent, or Firm—Wayland D. Keith

[57] ABSTRACT

A tractor mounted tree shaker for the harvesting of nuts and the like including power driven rotating weights within a chain suspended casing. The rotating weights set up vibrations which are transmitted to a tree through an enlarged casing mounted pad which engages against the tree by means of clamping apparatus. The clamping apparatus includes a second adjustable pad mounted on a hydraulically controlled arm whereby a clamping of a tree between the pads can be effected.

4 Claims, 9 Drawing Figures

Basil W. Savage
INVENTOR.

Basil W. Savage
INVENTOR.

TREE SHAKER WITH TREE EMBRACING CLAMP

This is a continuation of Ser. No. 68,731, filed Sept. 1, 1970 and now abandoned, which is a continuation-in-part of application Ser. No. 17,083, for TREE SHAKER, filed Mar. 6, 1970 now U.S. Pat. No. 3,594,999.

The instant invention generally relates to tree shakers, and is more particularly concerned with a uniquely constructed shaker which is particularly adapted to be mounted on and controlled from a conventional tractor incorporating a hydraulic system and a power take-off.

Important objects of the instant invention include the provision of a shaker which incorporates means for fixedly clamping the shaker to a tree in a simple and rapid manner whereby all of the vibratory forces generated by the shaker are transmitted to the tree for an effective shaking of the nuts or the like therefrom. Also, the shaker of the instant invention, being mountable on a tractor, incorporates a high degree of maneuverability in conjunction with an efficiency in operation and a basic simplicity in construction which results in a particularly practical unit.

Basically, in the shaker of the instant invention, vibration is effected by means of a pair of vertically orientated oppositely rotating sector-shaped eccentric weights. These weights are driven from the power take-off of the tractor and are located within an enclosed casing or housing. The casing directly mounts an enlarged pad engageable against the tree to be shaken with a second similar pad being mounted for selective movement toward and away from the first pad. The mounting of the second pad is effected through an elongated beam which slides longitudinally along the casing through the action of a double-acting piston and cylinder unit which also functions so as to fix the pads in clamped relation with the tree to be shaken. The entire shaker is suspended by means of flexible chains from a tractor mounted boom whereby no vibratory forces are transmitted to the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is an enlarged cross-sectional detail taken substantially on a plane passing along line 5—5 in FIG. 1;

FIG. 6 is an enlarged cross-sectional detail taken substantially on a plane passing along line 6—6 of FIG. 1;

Figure 1:
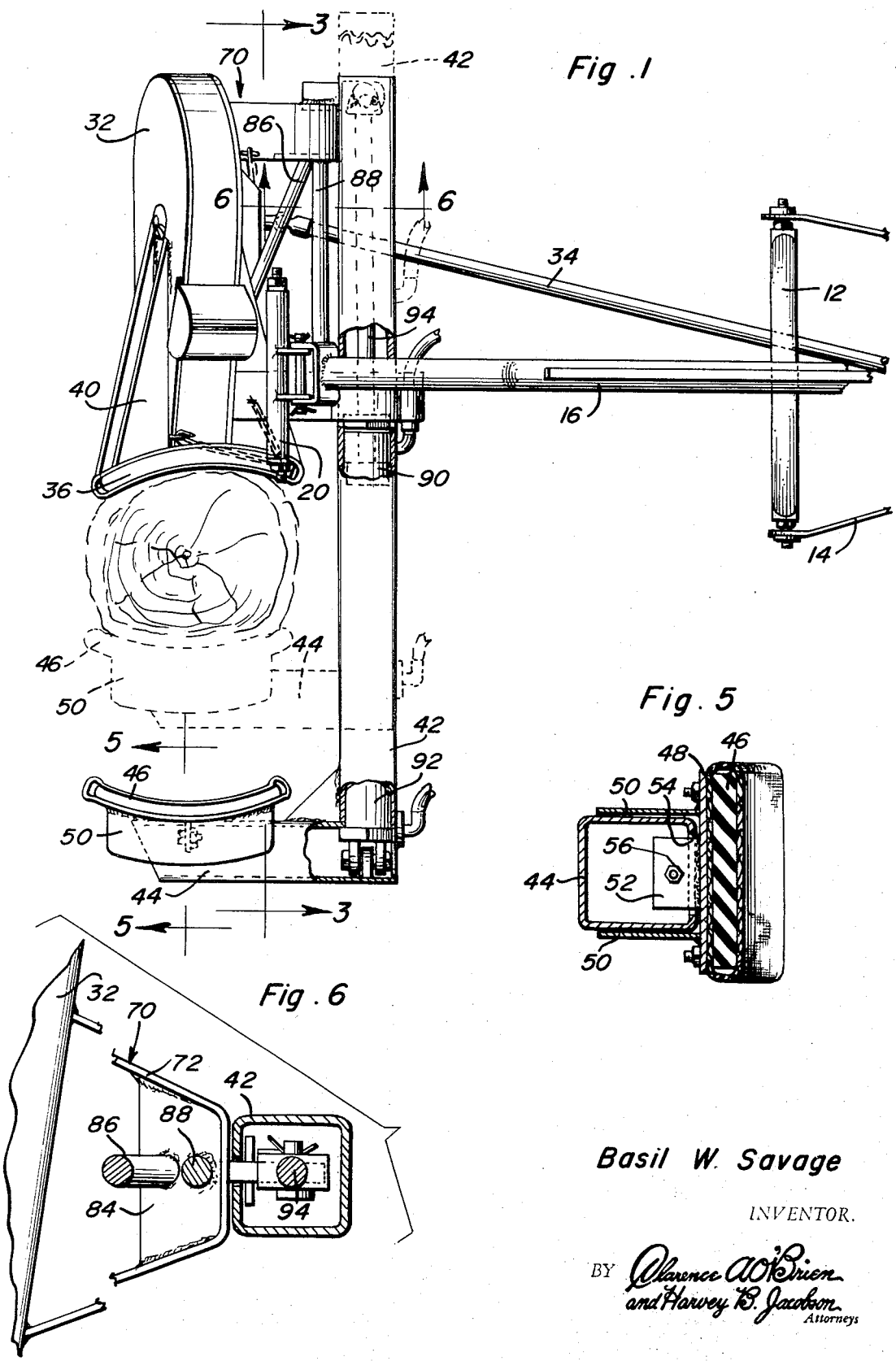
FIG. 1 is a top plan view, with portions broken away, of the shaker of the instant invention.
Figure 2:
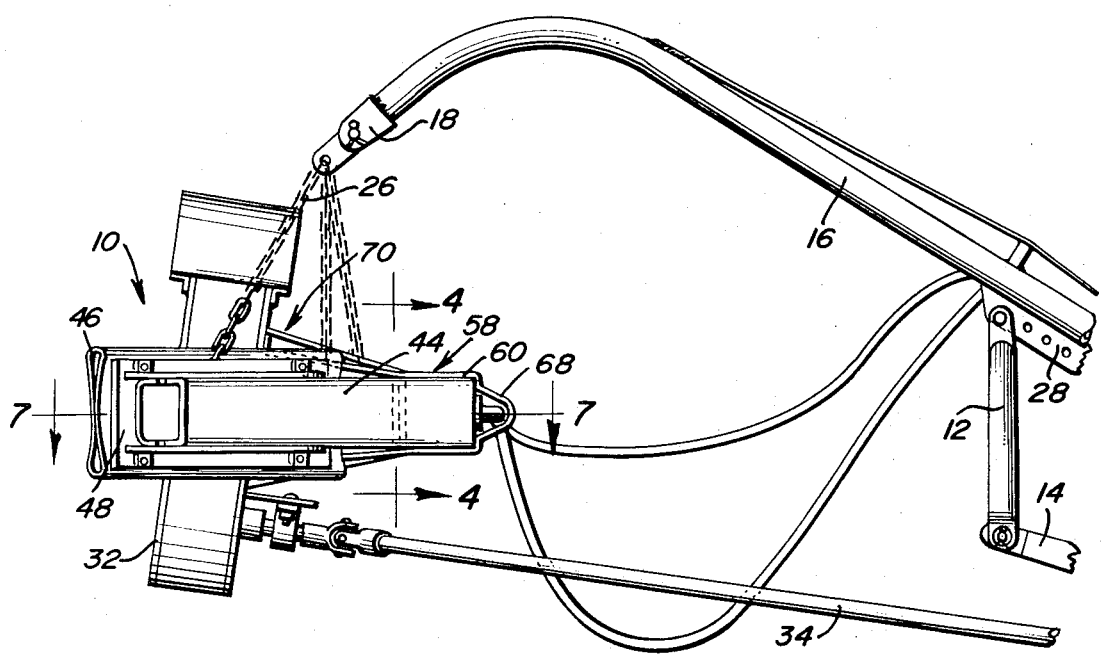
FIG. 2 is a side elevational view of the mounted shaker.
Figure 4:
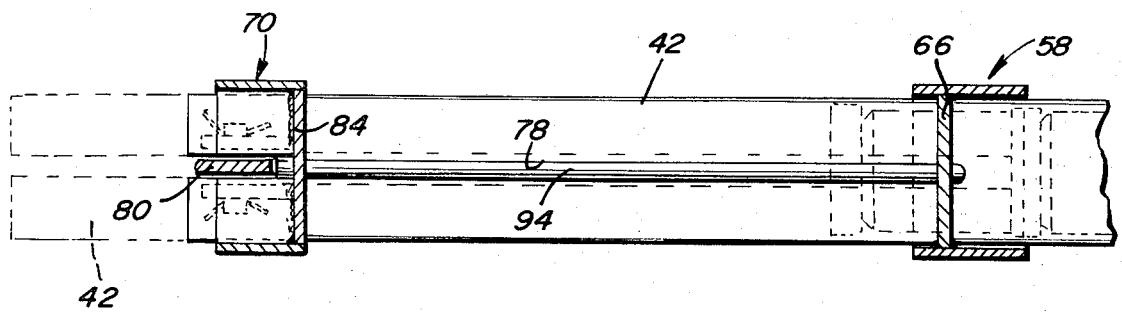
FIG. 4 is an enlarged cross-sectional view taken substantially on a plane passing along line 4—4 in FIG. 2.

Referring now more specifically to the drawings, reference numeral 10 is used to generally designate the shaker comprising the instant invention. This shaker is to be mounted on and powered from a conventional tractor incorporating a power takeoff and an appropriate three-point hitch.

Figure 3:
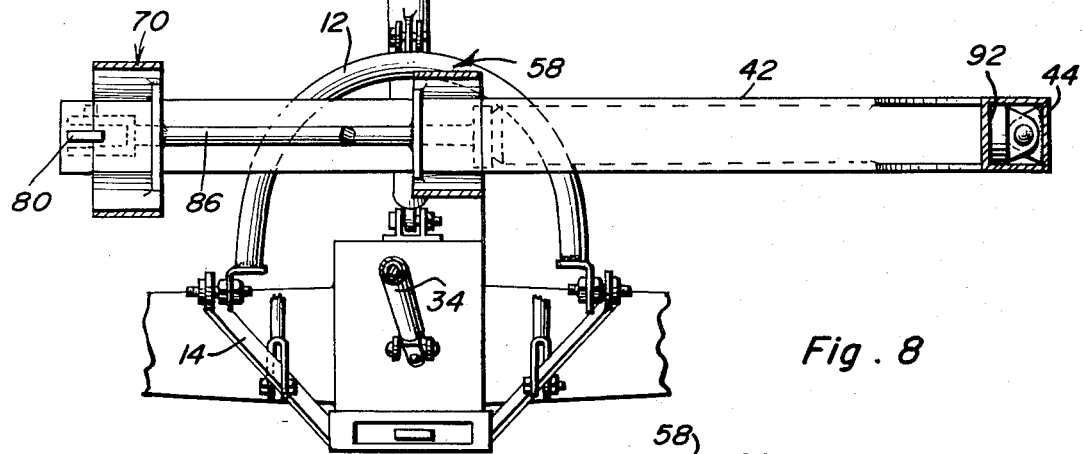
FIG. 3 is a cross-sectional view taken substantially on a plane passing along line 3—3 in FIG. 1.
Figure 8:
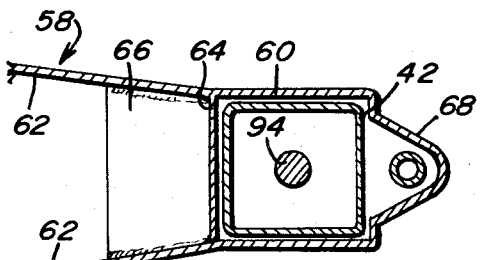
FIG. 8 is a cross-sectional detail taken substantially on a plane passing along line 8—8 in FIG. 7.
Figure 7:
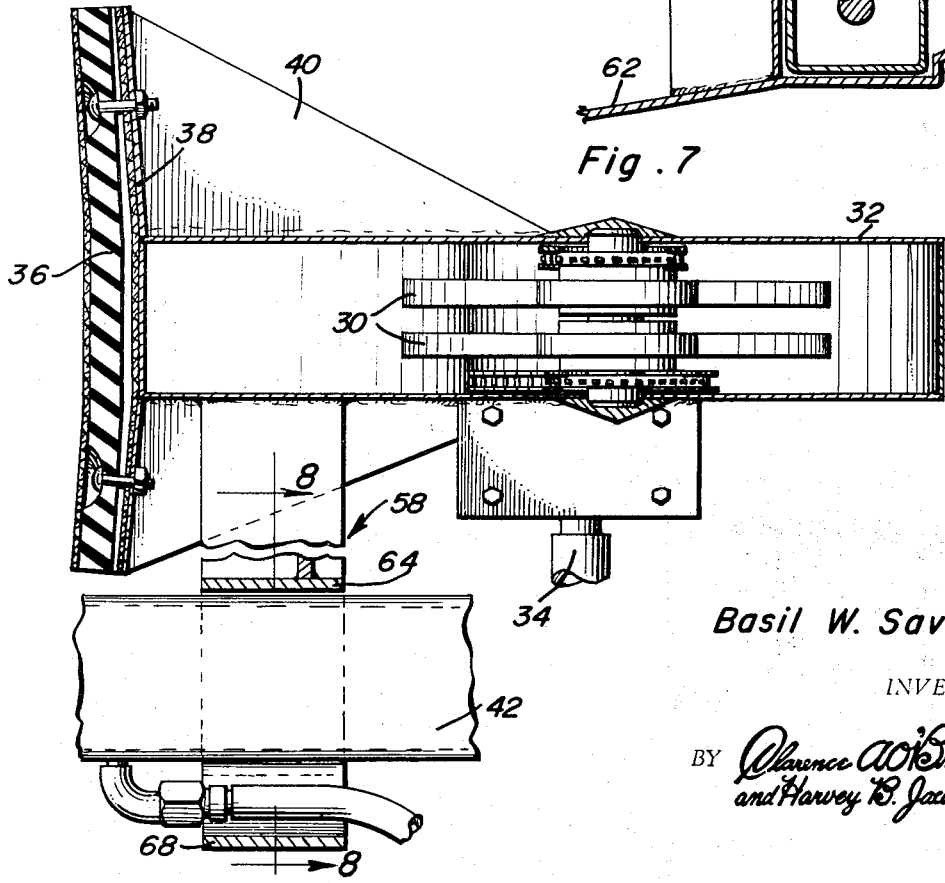
FIG. 7 is an enlarged cross-sectional detail taken on a plane passing along line 7—7 in FIG. 2.

In mounting the shaker 10, an upwardly extending arcuate yoke 12 is engaged with the two lower arms 14 of the hitch and projects upwardly therefrom for pivotal engagement with an elongated boom 16. The boom 16 has the inner end thereof (note FIG. 3) pivotally secured to the tractor for a vertical movement of the boom, while the outer end portion of the boom arcs downwardly and mounts a pair of laterally spaced ears 18. A short horizontal member 20 extends transversely across the outer end of the boom 16 and incorporates a pair of upwardly directed ears 22 which are received inwardly of the boom ears 18 with a common pin 24 projecting through the overlapped ears 18 and 22 and pivotally mounting the member 20. The member 20 in turn has flexible chains 26 affixed to the outer ends thereof and depending therefrom for fixed engagement with the shaker 10 itself, thereby providing a flexible support for the shaker which eliminates any tendency for a transfer of the vibrations generated by the shaker to the boom and tractor. The shaker 10 is vertically adjusted through a vertical adjustment of the boom 18 by a selective raising and lowering of the lower hitch arms 14 by the conventionally provided lift arms (not illustrated). Further, should it be deemed necessary, the engagement of the yoke 12 with the boom 16 can be adjusted as suggested by the provision of a plurality of apertures in the mounting plate 28 provided on the boom 16, the yoke 12 engaging the boom secured plate 28 through appropriate pin means.

The tree shaking vibrations are achieved through the rotational driving of a pair of sector-shape eccentric weights 30 mounted on a main shaft extending between the opposed walls of an enlarged housing or casing 32. The weights 30 are independently rotatable on the mounting shaft and are driven, through an appropriate series of chains and sprockets and an elongated drive shaft 34, from the power take-off of the tractor. The construction and operation of this vibration producing portion of the shaker 10, including the casing 32 and the eccentric weights 30, have been detailed in copending application Ser. No. 17,083, and that disclosure is incorporated herein by reference thereto.

The casing 32 and interior weights 30 are orientated at a slight angle to the vertical so as to properly orientate the vibration producing unit with the outer end of the power take-off drive shaft 34. An enlarged tree engaging covered pad 36 is provided transversely across the front of the housing 32 and is rigidly affixed thereto through an arcuate backing plate 38 welded both to the casing 32 and side projecting gusset plates 40 projecting from the casing 32. The pad 36 is to be so orientated relative to the casing 32 as to extend substantially horizontally when the shaker is in operative engagement with a tree, notwithstanding the slight off vertical orientation of the casing 32.

The clamping portion of the shaker, which cooperates with the pad 36 in embracing a tree and fixing the shaker to the tree for an efficient transmittal of the vibratory forces thereto, includes an elongated hollow beam 42 extending along the inner side of the casing 32 in inwardly spaced relation thereto. The forward end of the beam 42, positioned well forward of the casing mounted pad 36, includes a laterally projecting extension or arm 44 which mounts a second arcuate covered pad 46 orientated in facing relation to the first mentioned pad 36. This pad 46 includes an arcuate metal backing plate 48 having upper and lower projecting horizontally orientated flanges 50 which overlie the upper and lower surfaces of the extension 44 and cooperate therewith in mounting the pad 46 and maintaining the pad substantially horizontally orientated. A flat plate or plate-like ear 52 is welded centrally to the backing plate 48 between the upper and lower flanges 50 and extends through a slightly enlarged slot 54 in the adjoining vertical side of the extension 44. This ear 52, in inwardly spaced relation to the extension wall, includes a stop member, which may be in the nature of a threaded bolt 56 extending through the ear 52 and having an appropriate retaining nut thereon. This ear enables a self-alignment of adjustment of the pad 46, when brought into engagement with a tree, while at the same time acting so as to positively retain the pad 46 on the arm 44. The ear and slot, while illustrated as being vertical, can be horizontally orientated if deemed desirable.

The beam 44 is mounted for longitudinal sliding movement relative to the casing 32 by means of a first bracket 58 which consists of a flat rigid metal strap bent so as to define a central section 60 which encircles and slidably received the beam 42, and a pair of straight diverging end sections 62 which extend from the beam 42 to the adjoining casing, immediately rearward of the pad 36 thereon. The extreme ends of the bracket sections 62 are rigidly welded to the casing 32. The beam 42 is retained within the beam confining portion 60 of the bracket 58 by a transverse plate 64 which extends between the opposed bracket sections, with the bracket further being stabilized by a longitudinally extending gusset plate or the like 66, also positioned between the opposed sections 62 to the opposite side of the plate 64 from the slidable beam 42. If so desired, the bracket 58 can also be modified, as at 68, so as to accommodate one of the hose connections for the beam moving unit which shall be described subsequently.

The bracket 58 is, as previously indicated, fixed to the casing 32 toward the forward pad mounting end thereof, and receives and supports the central portion of the longitudinally movable beam 42. A second bracket 70 is mounted on the rear portion of the casing 32 in general alignment with the first bracket 58. The bracket 70 is likewise formed of a flat rigid strap bent so as to define upper and lower straight sections 72 having the free ends thereof welded to the casing 32, these sections converging outwardly toward the beam 42 and terminating in a vertical integral bight portion 74 immediately inward of the corresponding vertical face of the beam. This vertical face of the beam, designated by reference numeral 76, includes an elongated slot 78 therein through which a flat guide or guide plate 80 projects. The guide plate 80 is rigidly welded to the bight portion 74 of the bracket 70 and projects outwardly therefrom for reception through the slot 78. Immediately inward of the beam wall 76, the guide 80 is provided with vertical lugs 82 so as to cooperate with the bight portion 74 of the bracket 70 and slidably confine the corresponding vertical wall 76 of the beam 42 therebetween and act as a guide for the longitudinal movement of the beam 42. The bracket 70 is rigidified by means of a vertical gusset plate 84 provided between the upper and lower outwardly converging sections 72 immediately adjacent the bight portion 74. In addition, stabilizing rods 86 and 88 are provided, the rod 86 extending from the bracket gusset plate 84 forwardly at an outwardly directed angle to the side of the casing 32 toward the forward end thereof, while the rod 88 extends from the bracket gusset 84 to the gusset 66 on the forwardly located bracket 58.

The longitudinal movement of the beam 42, and hence the movement of the beam mounted pad 46 relative to the casing mounted pad 36, is effected by means of an elongated double-acting piston and cylinder unit 90, preferably located within the hollow beam 42 itself.

Figure 9:
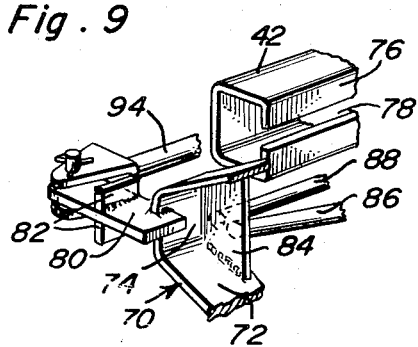
FIG. 9 is a perspective detail at the beam guiding portion of the shaker.

Noting FIGS. 1 and 9 in particular, the outer end of the cylinder 92 is secured, as by pin means, to the closed end of the beam 42 adjacent the lateral extension 44, while the outer end of the associated piston rod 94 is secured, by appropriate pin means, to the inner end of the guide plate 80 within the beam 42. With this arrangement, as the piston rod 94 is retracted within the cylinder 92, the beam 42, carrying the pad 46, will move rearwardly relative to the casing 32, projecting rearwardly of the casing 32 as indicated in phantom lines in FIG. 1. This rearward movement is accommodated by the elongated slot 78 in the inner wall 76 of the beam 42 with the guide plate 80 and associated lugs 82 cooperating with this wall in stabilizing and guiding the beam 42 during the longitudinal movement thereof. It will be appreciated that the range of movement will be such so as to accommodate trees of varying diameters with each tree, upon a mounting of the shaker 10 thereon, being firmly clamped so as to in effect rigidly lock the shaker 10 to the tree for a transfer of all the vibratory forces thereto. After sufficient shaking of the tree has been effected, the clamping apparatus is released by forwardly extending beam 42 and moving the beam mounted clamping pad 46 away from the tree. Incidently, it will be appreciated that the pads themselves provide for a cushion engagement with the tree so as to avoid any damage thereto either by the clamping engagement therewith or by the vibrating action to which the tree is to be subjected.

From the foregoing, it will be appreciated that a highly unique tree shaker has been defined. This shaker incorporates, in addition to the vibration producing unit, clamping means which enables a rapid and positive engagement and disengagement of the shaker with a tree without requiring the elaborate manipulation of clamping elements or the like in that the clamped engagement of the shaker with the tree is effected through the operation of a single piston and cycle unit which brings a pair of opposed tree embracing pads together against opposed portions of the tree. One of these pads is mounted directly on the vibration producing unit, while the other pad mounts on a lateral extension on one end of an elongated beam which is mounted on the vibration producing unit for longitudinal adjustment relative thereto through the operation of the aforementioned piston and cylinder unit. The entire shaker is suspended by flexible chains from a tractor mounted vertically adjustable boom whereby, upon a clamping of the shaker to a tree, the vibratory forces generated thereby are all transferred directly to the tree with little or no vibrations being transmitted to the tractor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree shaker unit for use in combination with a self-propelled tractor having a power take-off, which tree shaker unit comprises;
   a. an upstanding casing in said shaker unit,
      1. a bracket forming a beam confining portion secured to a side of said upstanding casing,
      2. a longitudinally movable, hollow beam slidably mounted in said beam confining portion of said bracket on said upstanding casing of said shaker unit,
      3. an arcuate, pad mounting backing plate secured to said upstanding casing,
      4. a first tree engaging, elastomer pad secured to said arcuate, pad mounting backing plate on said casing,
      5. an elongated, rotatable tractor power take-off drive shaft connected directly between said shaker unit and said tractor in driving relation,
   b. tree clamping means including,
      1. a laterally projecting extension arm secured to said beam near the outer end thereof,
      2. an arcuate, pad mounting, metal backing plate on said laterally projecting extension arm and being movable with respect thereto and therewith,
      3. projecting upper and lower, horizontally oriented flanges overlying the upper and lower surfaces of said laterally projecting extension arm,
      4. a second elastomer pad mounted on said arcuate, pad mounting backing plate in opposed relation to said first pad,
   c. a hydraulic cylinder-plunger assembly fitted within said longitudinally movable, hollow beam,
      1. said upstanding casing having an outstanding, apertured guide plate secured thereto,
      2. one end of said hydraulic cylinder-plunger assembly being connected to said apertured guide plate secured to said upstanding casing,
      3. the other end of said hydraulic cylinder-plunger assembly being connected to said longitudinally movable, hollow beam near the distal end thereof,
      4. said longitudinally movable, hollow beam having an elongated slot formed in a side thereof adjacent said upstanding casing for a portion of the length thereof, to slidably receive said outstanding apertured guide plate therein, so as to move said longitudinally movable, hollow beam to move said pads relative to each other for clamping a tree therebetween, when said cylinder-plunger assembly is in one position, to impart a shaking movement to the tree by the shaker unit, and to release said pads from engagement with the tree, when said hydraulic cylinder-plunger assembly is in another position.

2. A tree shaker as defined in claim 1; wherein
   a. three flexible support members are secured to said upstanding casing at spaced apart intervals, which support members extend upwardly and inwardly to a terminal to normally support said tree shaker unit in an upright position.

3. A tree shaker as defined in claim 2; wherein
   a. said flexible support members are three chains which support said upstanding casing in an upright position and said longitudinally movable, hollow beam in a substantially horizontal position to enable a tree to be clamped between said pads for a shaking operation, without manual attention.

4. A tree shaker as defined in claim 1; wherein
   a. a transverse, substantially horizontal shaft is mounted in said upstanding casing,
      1. a pair of eccentric weights is rotatably journaled on said transverse, substantially horizontal shaft for rotation about the axis thereof,
      2. a substantially horizontal driven shaft journaled in said upstanding casing,
      3. drive means connecting said respective eccentric weights with said driven shaft,
      4. said driven shaft in said upstanding casing is connected in substantially end to end, aligned, driven relation with said power take-off shaft and the shaft on the tractor to drive said eccentric weights for rotation in opposite directions, and
      5. said upright casing being slightly angulated with respect to the vertical, so all the shafts therein will be approximately parallel to the axis of said power take-off shaft.

* * * * *